(12) United States Patent
Han

(10) Patent No.: US 10,464,407 B2
(45) Date of Patent: Nov. 5, 2019

(54) ROLL ROD DEVICE FOR VEHICLE

(71) Applicants: HYUNDAI MOTOR COMPANY, Seoul (KR); KIA MOTORS CORPORATION, Seoul (KR)

(72) Inventor: Sang Hoon Han, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 120 days.

(21) Appl. No.: 15/797,908

(22) Filed: Oct. 30, 2017

(65) Prior Publication Data
US 2019/0047397 A1 Feb. 14, 2019

(30) Foreign Application Priority Data
Aug. 9, 2017 (KR) .................. 10-2017-0100984

(51) Int. Cl.
 *B60K 5/12* (2006.01)
 *F16F 3/087* (2006.01)
 *F16F 1/38* (2006.01)

(52) U.S. Cl.
CPC .......... *B60K 5/1241* (2013.01); *B60K 5/1216* (2013.01); *B60K 5/1291* (2013.01); *F16F 1/3849* (2013.01); *F16F 3/0873* (2013.01)

(58) Field of Classification Search
CPC .. B60K 5/1241; B60K 5/1208; B60K 5/1291; B62D 21/11
See application file for complete search history.

(56) References Cited

U.S. PATENT DOCUMENTS

| 5,129,479 | A  | * | 7/1992 | Fujii | B60K 5/1216 |
|---|---|---|---|---|---|
|  |  |  |  |  | 180/297 |
| 7,306,208 | B2 | * | 12/2007 | Hwang | B60G 21/055 |
|  |  |  |  |  | 267/140.12 |
| 8,439,377 | B2 | * | 5/2013 | Kim | B62D 21/11 |
|  |  |  |  |  | 280/124.109 |
| 8,839,900 | B2 | * | 9/2014 | Kim | F16F 13/1463 |
|  |  |  |  |  | 180/312 |
| 9,212,716 | B2 | * | 12/2015 | Yoon | F16F 6/005 |
| 9,610,818 | B2 | * | 4/2017 | Mark | B60K 5/1241 |
| 9,815,361 | B2 | * | 11/2017 | Patel | B60K 5/1241 |
| 9,868,345 | B2 | * | 1/2018 | Kim | F16F 1/371 |
| 10,131,219 | B2 | * | 11/2018 | Scharf | B60K 5/1241 |

* cited by examiner

*Primary Examiner* — Bradley Duckworth
(74) *Attorney, Agent, or Firm* — Morgan, Lewis & Bockius LLP

(57) ABSTRACT

A roll rod device for a vehicle includes a mounting flange mounted to a vehicle body; a housing of a cylindrical shape integrally formed at the mounting flange; a roll rod having a first end coupled to the housing to be slid and moved and a second end on which a bush unit is mounted; and an attenuation unit mounted to the first end of the roll rod and attenuating a vibration and an impact force while being slid and moved, or being compressed and tensioned in an axis direction of the roll rod inside the housing.

9 Claims, 7 Drawing Sheets

ROLL ROD DEVICE FOR VEHICLE

CROSS-REFERENCE TO RELATED APPLICATION

This application is based on and claims the benefit of priority to Korean Patent Application No. 10-2017-0100984 filed in the Korean Intellectual Property Office on Aug. 9, 2017, the entire contents of which are incorporated herein by reference.

TECHNICAL FIELD

The present disclosure relates to a roll rod device for a vehicle. More particularly, the present disclosure relates to a roll rod device for a vehicle reducing a vibration, a noise, and an impact force of an engine and a transmission.

BACKGROUND

Generally, a roll rod device of a vehicle supports a roll behavior of a powertrain. This roll rod device is fitted to connect a vehicle body or a sub-frame with a transmission of the vehicle.

This roll rod device includes a bush unit mounted to one end thereof and connected to the transmission, a body bracket having a front rubber and a rear rubber inside connected to the vehicle body, and a roll rod connecting the bush unit and the body bracket.

The above-configured roll rod device reduces and minimizes a vibration, a noise, and an impact force to be transmitted to the vehicle body by controlling a roll displacement of the engine and the transmission at the time of a forward and reverse moving of the vehicle, in which the rear rubber is compressed when the vehicle is moving forward while the front rubber is compressed when the vehicle is moving backward.

However, because the front and rear rubbers provided at the body bracket fixed to the vehicle body are not restrained inside the body bracket in a conventional roll rod device as described above, there is a problem that the impact causes during the forward and reverse shifting and during the acceleration and deceleration.

To prevent this, in the conventional roll rod device, the front and rear rubbers are compressed by a predetermined length the vehicle stops. However, due to the compression of the front and rear rubbers, a spring characteristic increases, which reduces an insulation ratio of front and rear rubbers, thereby deteriorating an overall NVH performance of the vehicle.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a roll rod device for a vehicle reducing the vibration, the noise, and the impact force of the engine and the transmission according to the state of the vehicle and beforehand preventing a vibration transmission to the vehicle body during an idling.

A roll rod device for a vehicle according to an exemplary embodiment of the present disclosure includes a mounting flange mounted to a vehicle body; a housing of a cylindrical shape integrally formed at the mounting flange; a roll rod having a first end coupled to the housing to be slid and moved and a second end on which a bush unit is mounted; and an attenuation unit mounted to one end of the roll rod and attenuating a vibration and an impact force while being slid and moved, or being compressed and tensioned in an axis direction of the roll rod inside the housing.

The roll rod may include a bush mounting part to which the bush unit is mounted; and a rod part having a first end fixed to the bush mounting part and the second end to which the attenuation unit is mounted.

A latching end may be integrally formed on an exterior circumference at the second end of the rod part.

The attenuation unit may include a main rubber having a first end fixed to the second end of the roll rod; a latching part integrally formed at a second end of the main rubber and disposed with a supporting plate inside; a stopper ring mounted inside the housing; and a pair of stopper rubbers mounted to an interior circumference of the housing at a position separated from the stopper ring toward the roll rod.

The main rubber may be adhered or injection-molded to the roll rod.

The supporting plate may be insert/injection-molded to the latching part.

The stopper ring may be mounted to the housing through a ring groove formed at the interior circumference of the housing.

The pair of stopper rubbers may be adhered to the interior circumference of the housing with an exterior circumference and is formed of a fan arc shape.

The pair of stopper rubbers may be disposed to face to each other at the interior circumference of the housing so that an insertion hole is formed between the pair of stopper rubbers.

In the latching part, a latching protrusion of a fan shape may be integrally formed at both sides of the exterior circumference facing to each other by corresponding to the pair of stopper rubbers.

As described above, according to the roll rod device for the vehicle according to an exemplary embodiment of the present disclosure, the vibration, the noise, and the impact force of the engine and the transmission may be efficiently attenuated according to the state of the vehicle, and the NVH performance of the vehicle may be improved by previously preventing the vibration transmission to the vehicle body during the idle.

Also, when the displacement size of the axis direction is small, the roll rod may freely move inside the housing, conversely, when the displacement size of the axis direction is large, the attenuation unit provided at the roll rod performs the function of the insulator while being tensioned and compressed, thereby simultaneously executing the vibration transmission prevention function and the vibration absorption function.

DETAILED DESCRIPTION

Figure 1:
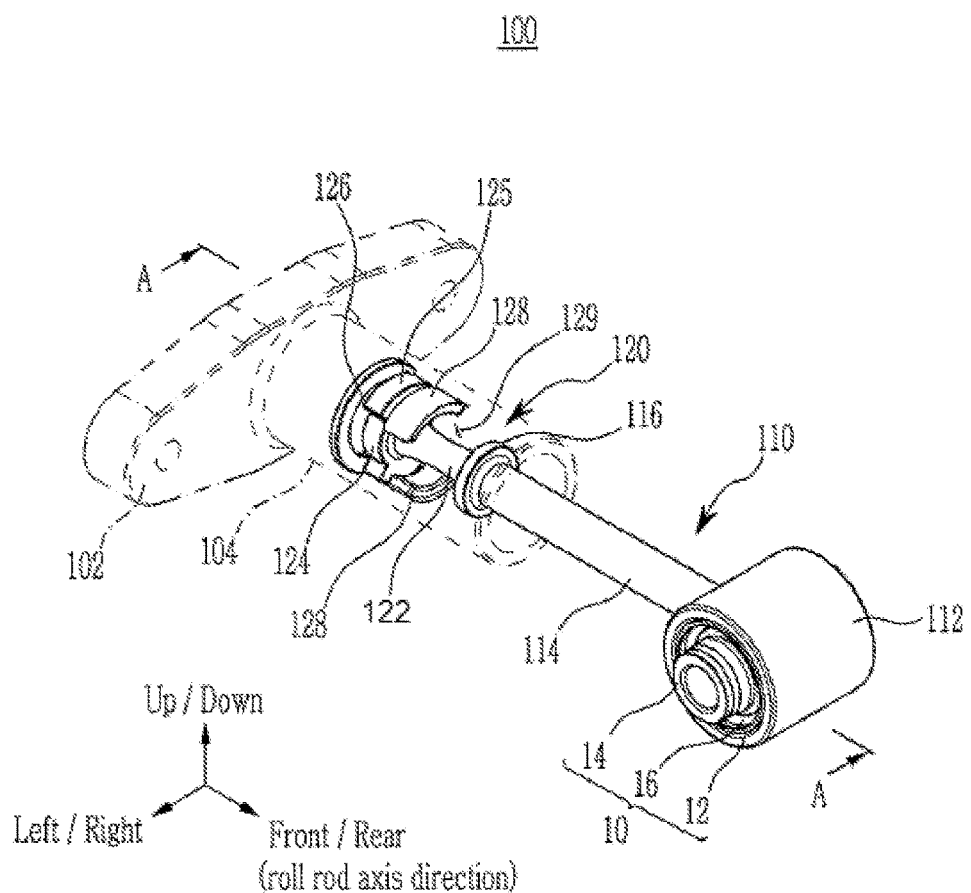
FIG. 1 is a perspective view of a roll rod device for a vehicle according to an exemplary embodiment of the present disclosure.

An exemplary embodiment of the present disclosure will hereinafter be described in detail with reference to the accompanying drawings.

The embodiment described in the present specification and the configuration shown in the drawings are merely an exemplary embodiment of the present disclosure and do not represent all of the technical spirit of the present disclosure. Thus, it should be understood that there may be various equivalents and modified examples that can replace the embodiments described in the present specification and the configuration shown in the drawings at the time of filling the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

In addition, unless explicitly described to the contrary, the word "comprise" and variations such as "comprises" or "comprising", will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
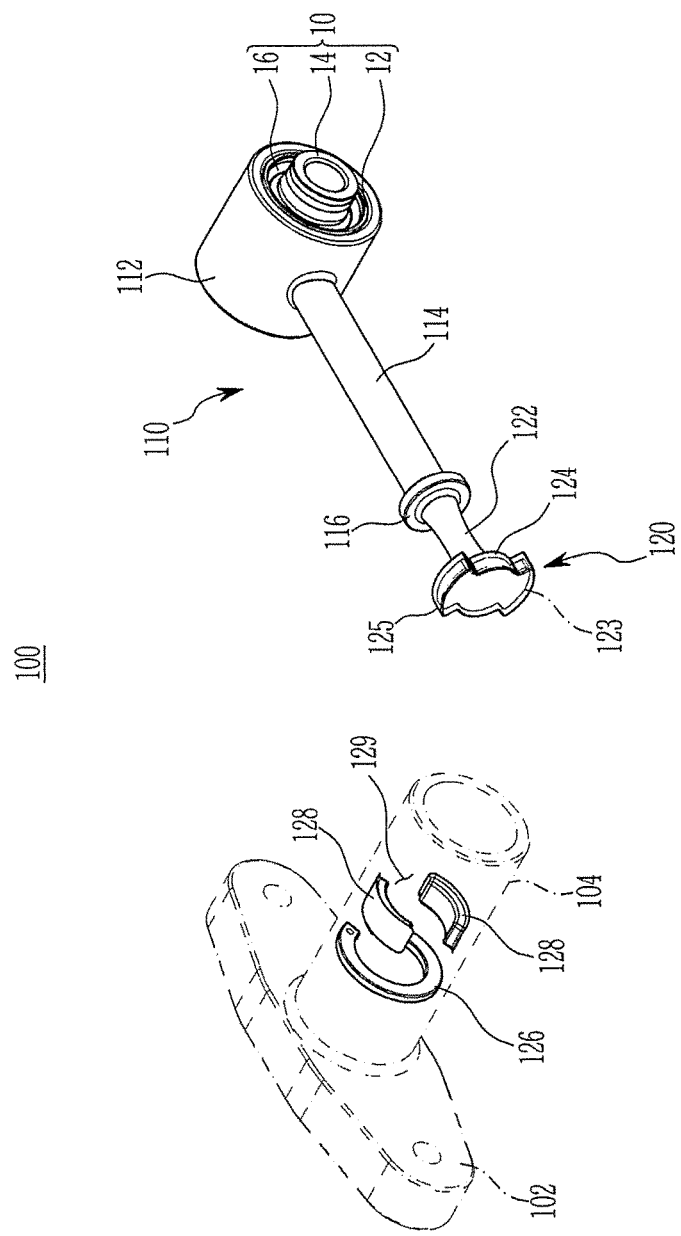
FIG. 2 is an exploded perspective view of a roll rod device for a vehicle according to an exemplary embodiment of the present disclosure.
Figure 3:
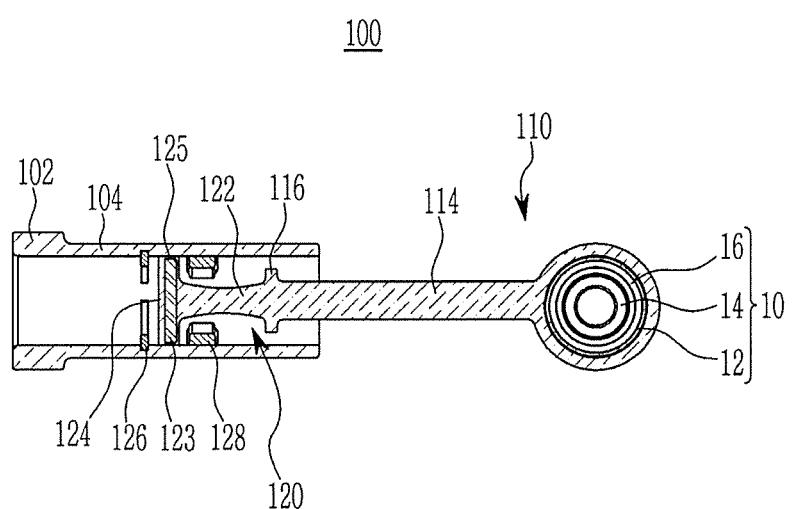
FIG. 3 is a cross-sectional view taken along a line A-A of FIG. 1.
Figure 4:
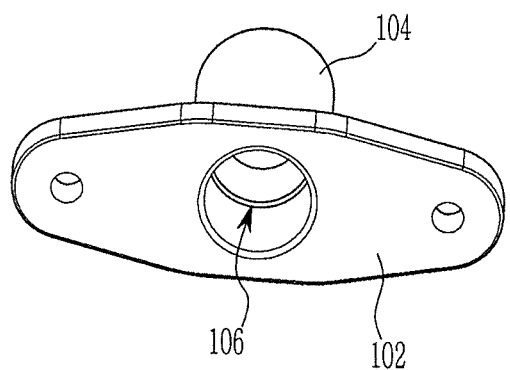
FIG. 4 is a perspective view of a mounting flange and a housing applied to a roll rod device for a vehicle according to an exemplary embodiment of the present disclosure.

FIG. 1 is a perspective view of a roll rod device for a vehicle according to an exemplary embodiment of the present disclosure, FIG. 2 is an exploded perspective view of a roll rod device for a vehicle according to an exemplary embodiment of the present disclosure, FIG. 3 is a cross-sectional view taken along a line A-A of FIG. 1, and FIG. 4 is a perspective view of a mounting flange and a housing applied to a roll rod device for a vehicle according to an exemplary embodiment of the present disclosure.

Referring to the drawings, the roll rod device for the vehicle 100 according to an exemplary embodiment of the present disclosure connects a vehicle body (not shown) and a transmission.

The roll rod device 100, as shown in FIG. 1 to FIG. 3, may include a mounting flange 102, a housing 104, a roll rod 110, and an attenuation unit 120.

Firstly, the mounting flange 102 is fixed to a non-illustrated vehicle body through a bolting.

The housing 104 is integrally formed at a center of one surface of the mounting flange 102. The housing 104 may be formed of a cylindrical shape of a hollow.

The roll rod 110 is coupled to the housing 104 such that one end is movable to be slid. The bush unit 10 may be fixed to the other end of the roll rod 110.

Here, the bush unit 10 may be configured of an outer pipe 12 forming an outer cylinder, an inner pipe 14 forming an inner cylinder, and an insulator 16 interposed between an interior circumference of the outer pipe 12 and an exterior circumference of the inner pipe 14 and adhered thereto.

On the other hand, the roll rod 110 may include a bush mounting part 112 to which the bush unit 10 is mounted and a rod part 114 having one end fixed to the bush mounting part 112 and the other end to which the attenuation unit 120 is mounted.

Here, a latching end 116 may be integrally formed at an exterior circumference of the other end of the rod part 114. The latching end 116 may be formed of a diameter larger than the diameter of the rod part 114 and may be formed of the diameter smaller than the interior diameter of the housing 104.

Accordingly, the roll rod 110 may freely move up and down directions and left and right directions inside the housing 104.

In the present exemplary embodiment, the attenuation unit 120 is mounted to one end of the roll rod 110. The attenuation unit 120 may attenuates the vibration and the impact force while being moved to be slid or being compressed and tensioned in an axis direction of the roll rod 110 inside the housing 104.

Here, the attenuation unit 120 may include a main rubber 122, a latching part 124, a stopper ring 126, and a stopper rubber 128.

Firstly, the main rubber 122 is fixed to the other end of the roll rod 110 through one end. Here, the main rubber 122 may be adhered or may be integrally injection-molded to the roll rod 110.

This main rubber 122 may form a circular cross-sectional and may be formed of a stick shape having a predetermined length.

The latching part 124 is integrally formed at the other end of the main rubber 122, and the supporting plate 123 is disposed inside.

The supporting plate 123 may be inserted and injection-molded to the latching part 124.

That is, the main rubber 122 is injection-molded along with the latching part 124 and the supporting plate 123 may be integrally manufactured with the insert-injection during the injection molding.

In the present exemplary embodiment, the stopper ring 126 is mounted inside the housing 104.

The stopper ring 126 may be mounted to the housing 104 through a ring groove 106 (referring to FIG. 4) formed at an interior circumference of the housing 104.

Also, the stopper rubber 128 is mounted at the interior circumference of the housing 104 at the position separated from the stopper ring 126 toward the roll rod 110. The stopper rubber 128 may be configured in a pair.

Here, the stopper rubber 128 may be adhered to the interior circumference of the housing 104 through the exterior circumference and may be formed of a fan-arc shape.

Also, the stopper rubbers 128 may be disposed to face to each other at the interior circumference of the housing 104 so that an insertion hole 129 is formed between the stopper rubbers 128.

On the other hand, the latching protrusion 125 of the fan shape may be integrally formed at the both sides of the exterior circumference facing to each other by corresponding to the stopper rubber 128 at the latching part 124.

When the roll rod 110 is assembled to the housing 104, as the latching protrusion 125 is home-positioned at the stopper rubber 128 between the stopper ring 126 and the stopper rubber 128, the roll rod 110 may be prevented from leaving from the housing 104.

In this way, the attenuation unit 120 may slide and move without a resistance between the stopper ring 126 and the stopper rubber 128 that are mounted inside the housing 104 when the displacement in the axis direction of the roll rod 110 is small at the vehicle idle.

Conversely, if the displacement of the roll rod 110 in the axial direction is large while the vehicle is traveling, the main rubber 122 may reduce the vibration and the impact force while being compressed or tensioned with the state that the latching part 124 is supported to the stopper ring 126 or the stopper rubber 128.

Next, the manufacturing and assembling method of the above-configured roll rod device for the vehicle 100 according to an exemplary embodiment of the present disclosure will be described.

Figure 5A:
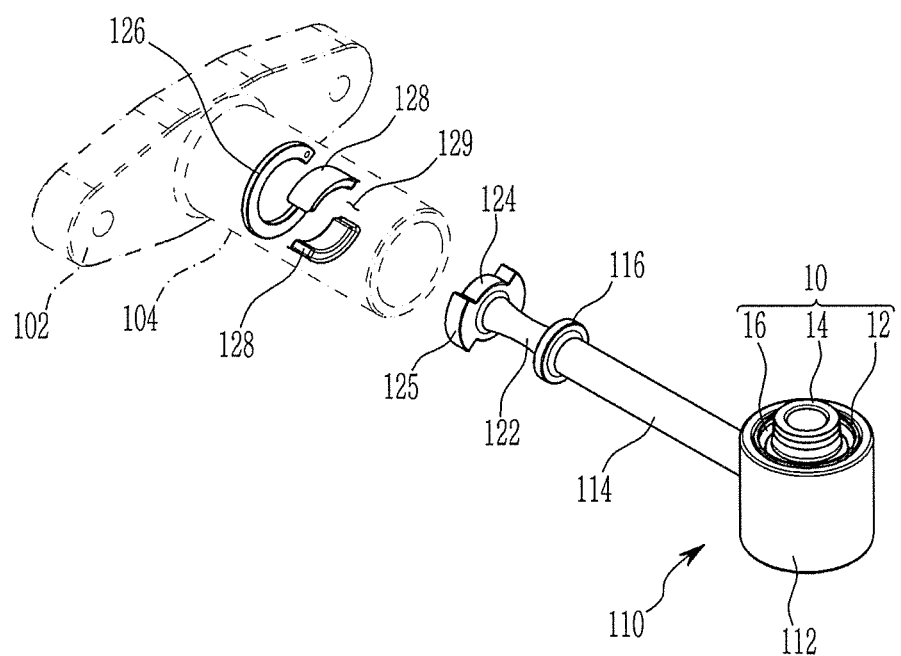
FIG. 5A to FIG. 5C are views showing an assemble state for each step of a roll rod device for a vehicle according to an exemplary embodiment of the present disclosure.
Figure 5B:
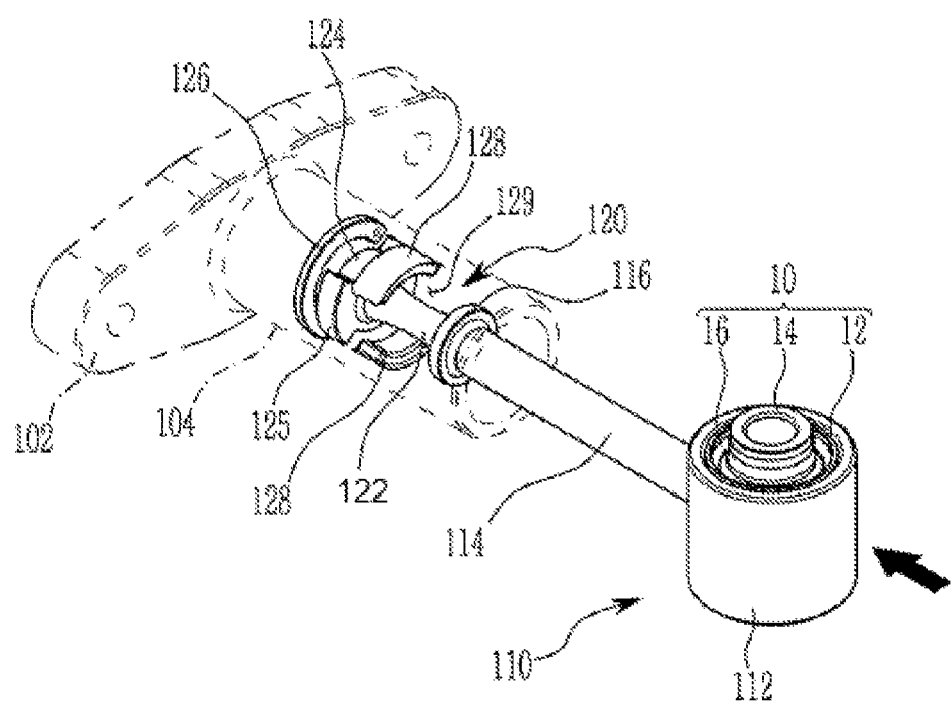
Figure 5C:
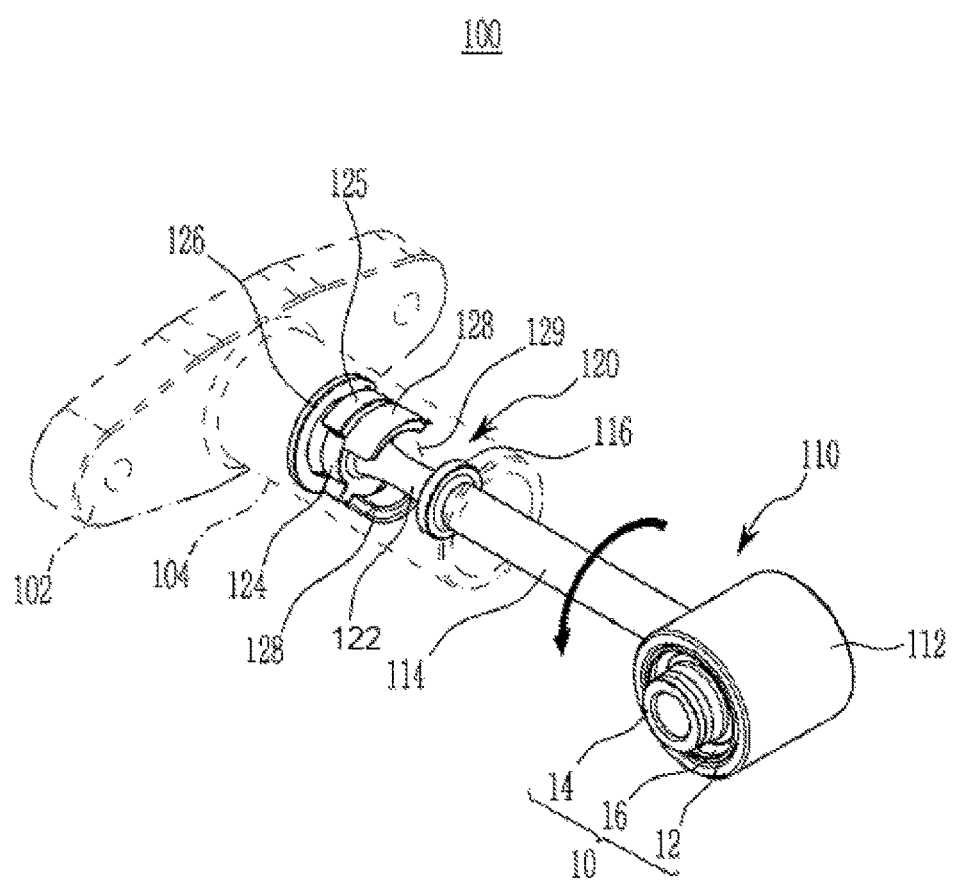

FIG. 5A to FIG. 5C are views showing an assemble state for each step of a roll rod device for a vehicle according to an exemplary embodiment of the present disclosure.

Firstly, a worker molds a mounting flange 102 to which the housing 104 of a cylindrical shape is integrally formed. Next, the worker molds a roll rod 110 of which the bush mounting part 112 is formed to mount the bush unit 10.

The worker processes a ring groove 106 to mount the stopper ring 126 at the interior circumference of the housing 104 in the completely-molded mounting flange 102. Next, the worker adheres a pair of stopper rubbers 128 inside the housing 104, and the stopper ring 126 is mounted on the ring groove 106.

Next, the worker molds the main rubber 122 and adheres the completely-molded main rubber 122 to the roll rod 110 to form a latching part 124 inside which a supporting plate 123 is disposed through the insert injection molding.

Here, the main rubber 122 may be injection-molded to the roll rod 110.

That is, the main rubber 122 may form the latching part 124 through the injection molding and may be simultaneously integrally formed to the roll rod 110.

If the adhering or the injection molding of the main rubber 122 is completed, the worker mounts the bush unit 10 to the bush mounting part 112.

In this state, the worker couples the roll rod 110 in which the bush unit 10 and the attenuation unit 120 are mounted to the housing 104.

Firstly, referring to FIG. 5A, the worker positions the roll rod 110 so that the latching protrusion 125 is positioned at the insertion hole 129. Next, as shown in FIG. 5B, the worker inserts the roll rod 110 to the housing 104.

Thus, a predetermined part of the attenuation unit 120 and the roll rod 110 is inserted inside the housing 104. Here, if the latching part 124 is positioned between the stopper ring 126 and the stopper rubber 128, the worker, as shown in FIG. 5C, as rotates the roll rod 110 by an angle of 90° so as to position the latching protrusion 125 at the stopper rubber 128, the assembly of the roll rod 110 for the housing 104 of the mounting flange 102 may be completed.

Thus, the roll rod device 100 completed with the assembly may reduce the vibration and the impact force generated during the idle or the driving of the vehicle through the attenuation unit 120.

That is, when the axis direction displacement of the roll rod 110 is small during the idle of the vehicle, the attenuation unit 120 may slide and move without the resistance between the stopper ring 126 and the stopper rubber 128 that are mounted inside the housing 104.

Accordingly, the roll rod device 100 may previously prevent the vibration and the impact force generated in the engine and the transmission from being transmitted to the vehicle body.

Conversely, if the displacement of the roll rod 110 in the axial direction is large while the vehicle is traveling, the main rubber 122 may reduce the vibration and the impact force while being compressed or tensioned with the state that the latching part 124 is supported to the stopper ring 126 or the stopper rubber 128, thereby reducing the vibration, the noise, and the impact force.

Also, the roll rod 110 may be mounted to be freely moved in up/down directions and right/left directions along with the attenuation unit 120 inside the housing 104, thereby efficiently attenuating thereby efficiently attenuating bounce, rolling, yawing, bumping and pitching behaviors of according to the driving state of the traveling state of the vehicle.

Accordingly, if the above-configured roll rod device for the vehicle 100 according to an exemplary embodiment of the present disclosure is applied, the vibration, the noise, and the impact force of the engine and the transmission may be efficiently attenuated depending on the state of the vehicle, and the vibration transmission to the vehicle body may be previously prevented during the idle, thereby improving the NVH performance of the vehicle.

Also, when the size of the axis direction displacement is small, the roll rod 110 may freely move inside the housing 104, conversely, when the size of the axis direction displacement is large, the attenuation unit 120 provided at the roll rod 110 performs the function of the insulator while being tensioned and compressed, thereby simultaneously executing the vibration transmission prevention function and the vibration absorption function.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A roll rod device for a vehicle comprising:
   a mounting flange;
   a housing of a cylindrical shape integrally formed at the mounting flange;
   a roll rod having a first end slidably coupled to the housing and a second end; and
   an attenuation unit mounted to the first end of the roll rod so as to attenuate a vibration and an impact force when the attenuation unit is slid, or compressed and tensioned in an axis direction of the roll rod inside the housing,
   the attenuation unit includes:
   a main rubber having a first end fixed to the first end of the roll rod;
   a latching part integrally formed at a second end of the main rubber and having a supporting plate disposed therein;
   a stopper ring mounted inside the housing; and
   a pair of stopper rubbers mounted to an interior circumference of the housing at a position separate from the stopper ring toward the roll rod.

2. The roll rod device for the vehicle of claim 1, wherein:
the roll rod includes:
a bush mounting part to which a bush unit is mounted; and
a rod part having a first end fixed to the bush mounting part and a second end to which the attenuation unit is mounted.

3. The roll rod device for the vehicle of claim 2, wherein:
a latching end is integrally formed on an exterior circumference at the second end of the rod part.

4. The roll rod device for the vehicle of claim 1, wherein:
the main rubber is adhered or injection-molded to the roll rod.

5. The roll rod device for the vehicle of claim 4, wherein:
the supporting plate is inserted and injection-molded to the latching part.

6. The roll rod device for the vehicle of claim 1, wherein:
the stopper ring is mounted to the housing through a ring groove formed at the interior circumference of the housing.

7. The roll rod device for the vehicle of claim 1, wherein:
an exterior circumference of the pair of stopper rubbers is adhered to the interior circumference of the housing and is formed of an arc shape.

8. The roll rod device for the vehicle of claim 7, wherein:
the pair of stopper rubbers are disposed to face each other at the interior circumference of the housing so that an insertion hole is arranged between the pair of stopper rubbers.

9. The roll rod device for the vehicle of claim 8, wherein:
a pair of latching protrusions, each having a fan shape, protrude from both sides of an exterior circumference of the latching part and face each other so that the pair of latching protrusions respectively correspond to the pair of stopper rubbers.

* * * * *